(12) United States Patent
Lund (10) Patent No.: US 9,189,618 B2
(45) Date of Patent: *Nov. 17, 2015

(54) SECURE PASSWORD GENERATION

(71) Applicant: International Business Machines Corporation, Armonk, NY (US)

(72) Inventor: Arnaud Lund, Cagnes-sur-mer (FR)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/283,307

(22) Filed: May 21, 2014

(65) Prior Publication Data

US 2014/0258728 A1 Sep. 11, 2014

Related U.S. Application Data

(63) Continuation of application No. 13/343,744, filed on Jan. 5, 2012, now Pat. No. 8,775,821.

(30) Foreign Application Priority Data

Oct. 20, 2011 (EP) ..................................... 11306355

(51) Int. Cl.
*G06F 21/46* (2013.01)
*G06F 21/34* (2013.01)

(52) U.S. Cl.
CPC ............... *G06F 21/46* (2013.01); *G06F 21/34* (2013.01)

(58) Field of Classification Search
CPC ................................ G06F 21/34; G06F 21/46
USPC ........................................... 713/13–185, 189
See application file for complete search history.

(56) References Cited

U.S. PATENT DOCUMENTS

| | | | |
|---|---|---|---|
| 7,523,318 B2 | 4/2009 | Goal et al. | |
| 7,904,729 B2 | 3/2011 | Little et al. | |
| 8,775,821 B2 | 7/2014 | Lund | |
| 2006/0026439 A1 | 2/2006 | Moseley | |
| 2007/0214369 A1* | 9/2007 | Roberts et al. | ................ 713/192 |
| 2007/0245149 A1 | 10/2007 | Lin | |
| 2008/0072036 A1 | 3/2008 | Anzelde et al. | |

(Continued)

FOREIGN PATENT DOCUMENTS

JP 2003296282 10/2003

OTHER PUBLICATIONS

Office Action (Mail Date Aug. 2, 2013) for U.S. Appl. No. 13/343,744, filed Jan. 5, 2012.

(Continued)

*Primary Examiner* — Kambiz Zand
*Assistant Examiner* — Noura Zoubair
(74) *Attorney, Agent, or Firm* — Schmeiser, Olsen & Watts; John Pivnichny (57) ABSTRACT

A secure password generation method and system is provided. The method includes enabling by a processor of a computing system, password translation software. The computer processor generates and stores the random translation key. A first password is received and a second associated password is generated. The computer processor associates the second password with a secure application. The computer processor stores the random translation key within an external memory device and disables a connection between the computing system and the external memory device.

18 Claims, 5 Drawing Sheets

(56) References Cited

U.S. PATENT DOCUMENTS

| | | | |
|---|---|---|---|
| 2008/0276098 A1* | 11/2008 | Florencio et al. | 713/183 |
| 2009/0150991 A1* | 6/2009 | Hoey et al. | 726/18 |
| 2009/0260077 A1* | 10/2009 | Zhu et al. | 726/19 |
| 2013/0103949 A1 | 4/2013 | Lund | |

OTHER PUBLICATIONS

Amendment filed Sep. 30, 2013 in response to Office Action (Mail Date Aug. 2, 2013) for U.S. Appl. No. 13/343,744, filed Jan. 5, 2012.

Final Office Action (Mail Date Dec. 18, 2013) for U.S. Appl. No. 13/343,744, filed Jan. 5, 2012.

Response After Final Feb. 7, 2014 in reply to Final Office Action (Mail Date Dec. 18, 2013) for U.S. Appl. No. 13/343,744, filed Jan. 5, 2012.

Notice of Allowance (Mail Date Feb. 28, 2014) for U.S. Appl. No. 13/343,744, filed Jan. 5, 2012.

\* cited by examiner

SECURE PASSWORD GENERATION

This application is a continuation application claiming priority to Ser. No. 13/343,744 filed Jan. 5, 2012.

FIELD

The present invention relates method and associated system for generating and enabling a secure password.

BACKGROUND

Securing data typically comprises an inaccurate process with little flexibility. Data security within a system typically includes a tedious process that may be time consuming. Accordingly, there exists a need in the art to overcome at least some of the deficiencies and limitations described herein above.

SUMMARY

The present invention provides a method comprising: enabling, by a computer processor of a computing system, password translation software; generating, by the computer processor executing the password translation software, a random translation key; storing, by the computer processor within an external memory device, the random translation key, wherein the external memory device is external to the computing system; first receiving, by the computer processor from a user, a first password comprising a first string of characters; generating, by the computer processor executing the random translation key, a second password associated with the first password, wherein the second password comprises a second string of characters differing from the first string of characters; associating, by the computer processor in response to a command from the user, the second password with a first secure application associated with the user; and disabling a connection between the computing system and the external memory device.

The present invention provides computing system comprising a computer processor coupled to a computer-readable memory unit, the memory unit comprising instructions that when executed by the computer processor implements a method comprising: enabling, by said computer processor, password translation software; generating, by the computer processor executing the password translation software, a random translation key; storing, by the computer processor within an external memory device, the random translation key, wherein the external memory device is external to the computing system; first receiving, by the computer processor from a user, a first password comprising a first string of characters; generating, by the computer processor executing the random translation key, a second password associated with the first password, wherein the second password comprises a second string of characters differing from the first string of characters; associating, by the computer processor in response to a command from the user, the second password with a first secure application associated with the user; and disabling a connection between the computing system and the external memory device.

The present invention provides computer program product, comprising a computer readable storage device storing a computer readable program code, the computer readable program code comprising an algorithm that when executed by a computer processor of a computing system implements a method, the method comprising: enabling, by said computer processor, password translation software; generating, by the computer processor executing the password translation software, a random translation key; storing, by the computer processor within an external memory device, the random translation key, wherein the external memory device is external to the computing system; first receiving, by the computer processor from a user, a first password comprising a first string of characters; generating, by the computer processor executing the random translation key, a second password associated with the first password, wherein the second password comprises a second string of characters differing from the first string of characters; associating, by the computer processor in response to a command from the user, the second password with a first secure application associated with the user; and disabling a connection between the computing system and the external memory device.

The present invention advantageously provides a simple method and associated system capable of securing data.

DETAILED DESCRIPTION

Figure 1:
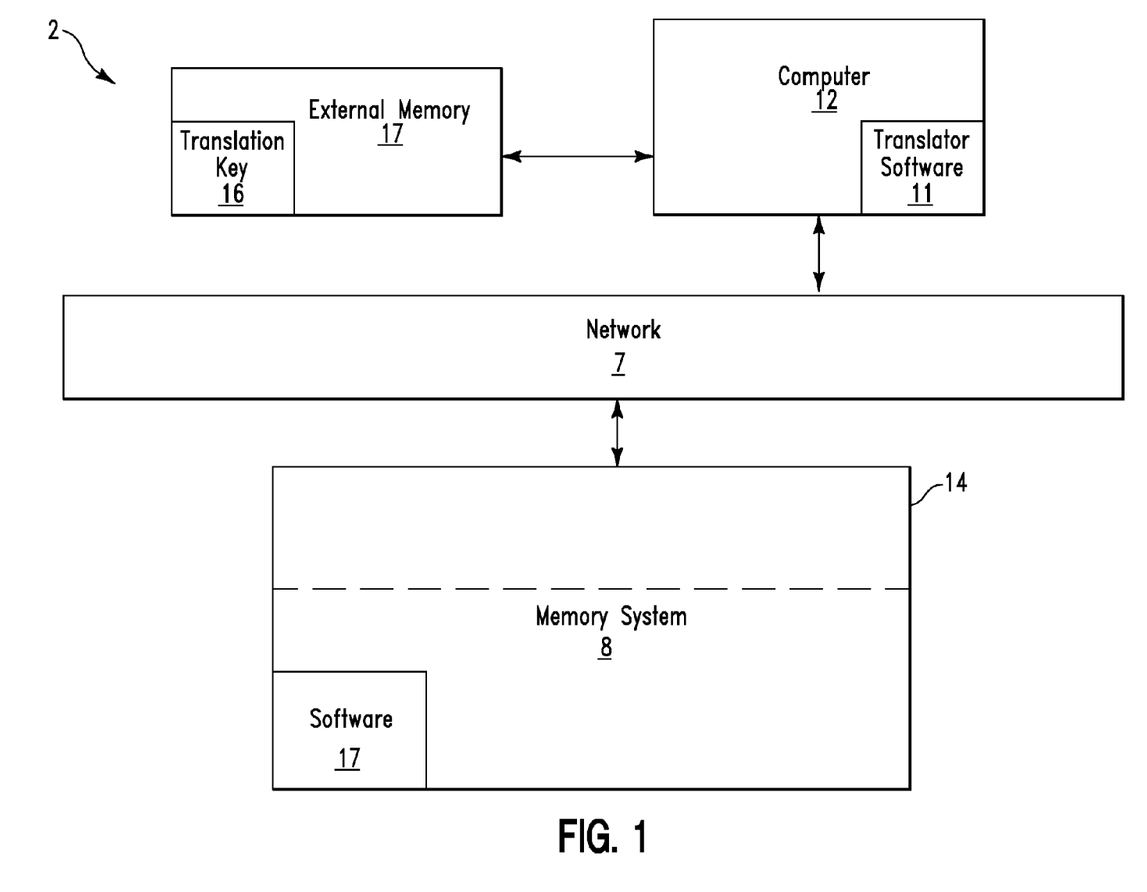
FIG. 1 illustrates a system for generating a secure password, in accordance with embodiments of the present invention.

FIG. 1 illustrates a system 2 for generating a secure password, in accordance with embodiments of the present invention. System 2 uses a translation key (e.g., a translation table) for generating a secure password associated with a simple password for enabling access to a secure application. A translation table associates a given character with a string of one or more different characters.

System 2 of FIG. 1 comprises a computer 12 connected through a network 7 to a computing system 14. Additionally, an external memory device 17 is connected to computer 12. Network 7 may comprise any type of network including, inter alia, a local area network, (LAN), a wide area network (WAN), the Internet, a wireless network, etc. Computer 12 and computing system 14 may comprise any type of computing system(s) including, inter alia, a computer (PC), a laptop computer, a server, a PDA, etc. Computer 12 comprises translator software for generating a translation key or table (e.g., translation key 16). Computing system 14 comprises a memory system 8. Memory system 8 may comprise a single memory system. Alternatively, memory system 8 may comprise a plurality of memory systems. Memory system 8 comprises a secure software application 18. Software application 18 comprises a secure application requiring secure access by a user (e.g., a Webpage allowing secure access to banking records). Alternatively, software application or any other secure records may reside on computer 12 (e.g., personal information on a user's personal computer). External memory device 17 comprises a translation key (or table) 16 generated by translator software 11. External memory device 17 may comprise any type of portable memory device including, inter alia; a universal serial bus (USB) device e.g., a USB key or jump drive, a USB hard drive, a USB flash drive, etc), a memory card (e.g., SD, micro SD, memory stick, PC card, etc), a CD or DVD ROM, etc.

The following implementation example describes an installation and usage process enabled by system 2 and requiring computer 12 and external memory 17 for generating and enabling a secure password associated with a simple inputted password in order to enable access to software application 18:

Installation

1. Translator software 11 is installed on computer 12.
2. Translator software 11 generates an encryption key and a random translation key or table (e.g., translation key 18) that translates each possible character (of a first password) into a string of one or more characters For example:
A=W ?z
B=1L
C=!$U3 d
3. Translator software 11 encrypts the translation table using the encryption key. The encryption key is stored on computer 12 and the encrypted translation table is stored on a portable media device (e.g., external memory device 17).

Usage

A user secures a userid of his/her secure bank account application based on the following steps:
1. The user connects external memory 17 to computer 12.
2. The user enables translator software 11.
3. Translator software 11 retrieves translation key 18 from external memory 17 and decrypts the translation key 16 using the encryption key stored during installation.
4. The user selects a (simple) first password (e.g., 1234) and enters the first password into translator software 11.
5. Translator software 11 (optionally) generates a new translation key from the original translation key 16, the first password, and additional (optional) elements or attributes such as: a name that the user provides to identify the application, the username used to logon, and/or data such as a current ip address, etc.
6. Using the translation key 18 or table, the first password in translated into a secure password. For example, a password "1234" is translated to a secure password "A?xwP13K!-$"
7. Translator software 11 presents the secure password to the user. For example the secure password may be copied into a clipboard.
8. The user may now initiate a password change function associated with his bank account application and paste the secure password into fields associated with a new password. The next time the user attempts to access his/her bank account application, he/she will repeat step 1-7 and then will paste the secure password into the password entry field of the login screen for the bank account application.

System 2 allows a user to generate different secure passwords for different applications using a single simple password and a name associated with each application. For example, a user may select a name "my bank account" and this name is associated with a specific translated password.

The following implementation example describes a login process enabled by system 2.

After installing translator software 11 and translation key 16 is generated and stored on external memory 17, a user initiates a process for logging into a news application as follows:

The user navigates to a login screen for the news application and enters a user name. Next, the user initiates translator software 11 and enters the username, a name of the news application (e.g., news A) and a simple password (e.g., 1234). In response, translator software 11 combines the translation key 16 and the information provided (i.e., the username, the name of the news application, and the simple password to compute a complex password. The same complex password will be generated each time the input is identical. The complex password is displayed or pushed in a clip board so that the user may paste it in the login screen for the news application.

Figure 2:
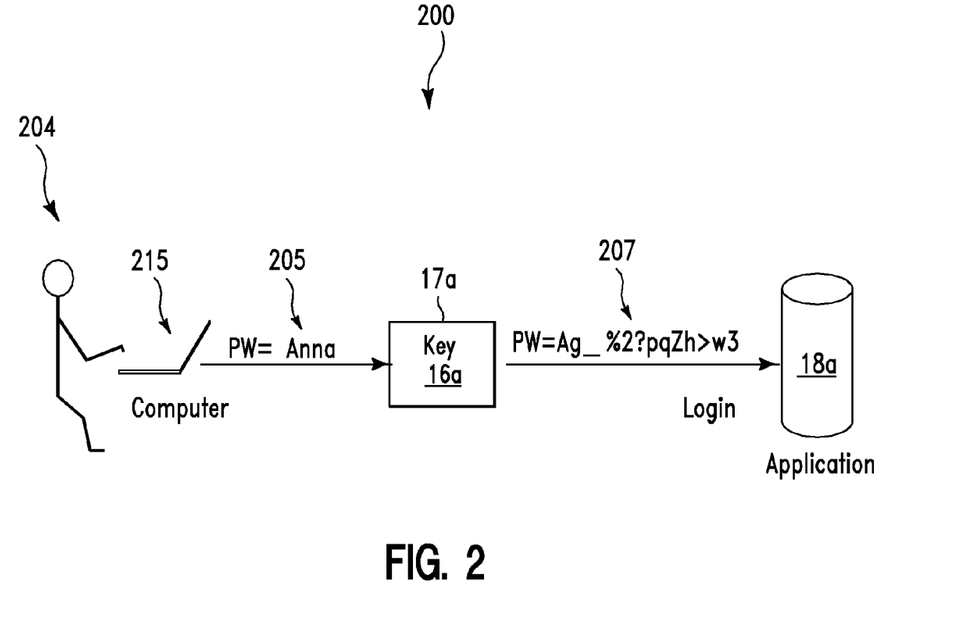
FIG. 2 illustrates a map detailing the conversion of a simple password to a complex password, in accordance with embodiments of the present invention.

FIG. 2 illustrates a map 200 detailing the conversion of a simple password 205 to a complex password 207, in accordance with embodiments of the present invention. Map 200 details a process that includes a user 204 entering a password 205 (Anna) via a computer 215. The password 205 is converted (by translation key 16a stored on an external memory device 17a connected to computer 215) into a complex password 207. Complex password 207 is used by the user to login to a secure application 18a (e.g., a banking application).

Figure 3:
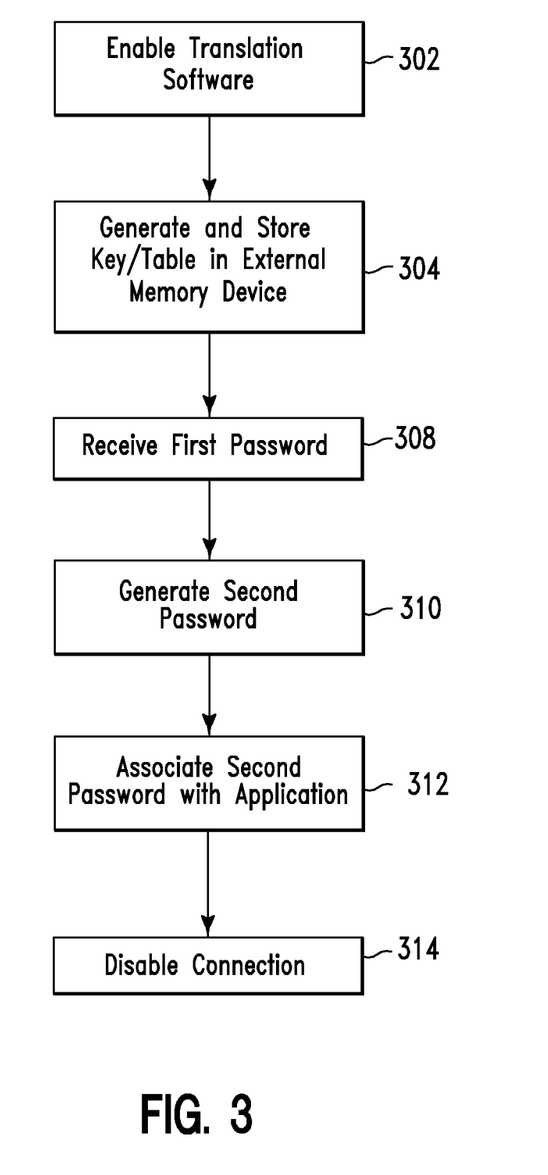
FIG. 3 illustrates a flowchart describing an algorithm used by the system of FIG. 1 for enabling an installation process for generating a secure password, in accordance with embodiments of the present invention.

FIG. 3 illustrates a flowchart describing an algorithm used by system 2 of FIG. 1 for enabling an installation process enabled for generating a secure password, in accordance with embodiments of the present invention. In step 302, a computer processor of a computing system (e.g., computing system 14 of FIG. 1) enables password translation software. In step 304, the computer processor (executing the password translation software) generates a random translation key (e.g., a translation table). The random translation key is stored within an external (external to the computing system). In step 308, the computer processor receives (from a user) a first password comprising a first string of characters. In step 310, the computer processor (executing the random translation key) generates a second password associated with the first password. The second password comprises a second string of characters differing from the first string of characters. In step 312, the computer processor (in response to a command from the user) associated the second password with a first secure application associated with the user. In step 314, the computer processor disables a connection between the computing system and the external memory device (e.g., the external memory device is removed from the computing system).

Figure 4:
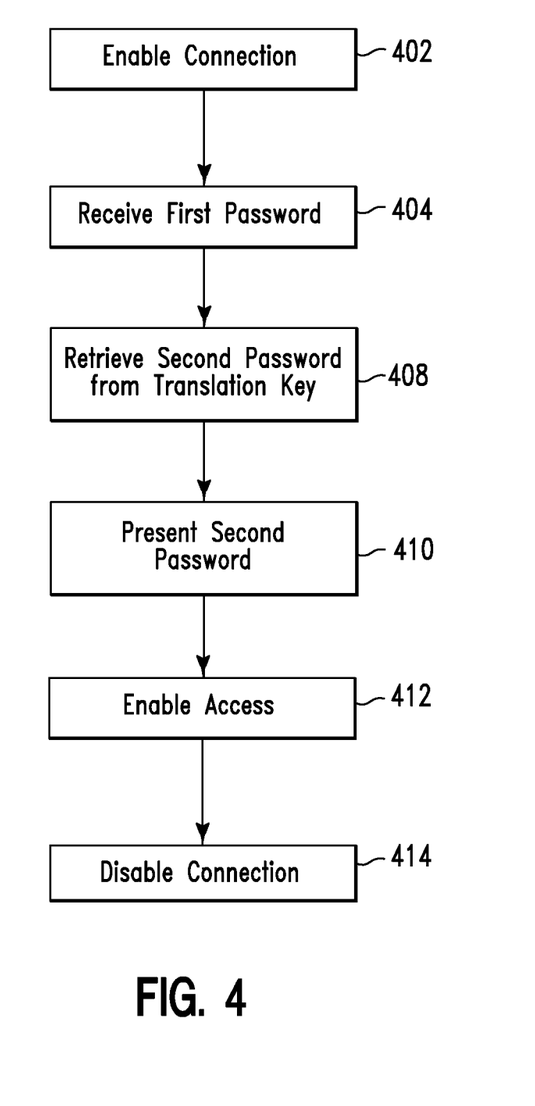
FIG. 4 illustrates a flowchart describing an algorithm used by the system of FIG. 1 for enabling a usage process based on a secure password, in accordance with embodiments of the present invention.

FIG. 4 illustrates a flowchart describing an algorithm used by system 2 of FIG. 1 for enabling a usage process based on a secure password, in accordance with embodiments of the present invention. In step 402, a computer processor of a computing system (e.g., computing system 14 of FIG. 1) enables a connection between the computing system and the external memory device. In step 404, the computer processor receives (from the user) the first password (generated in FIG. 3). In step 408, the computer processor retrieves (from the external memory device) the second password from the random translation key (generated in FIG. 3). In step 410, the computer processor presents the second password to a login screen associated with the first secure application. In step 412, the computer processor enables access to the first secure application (in response to presenting the second password). In step 414, the computer processor disables the connection between the computing system and the external memory device.

Figure 5:
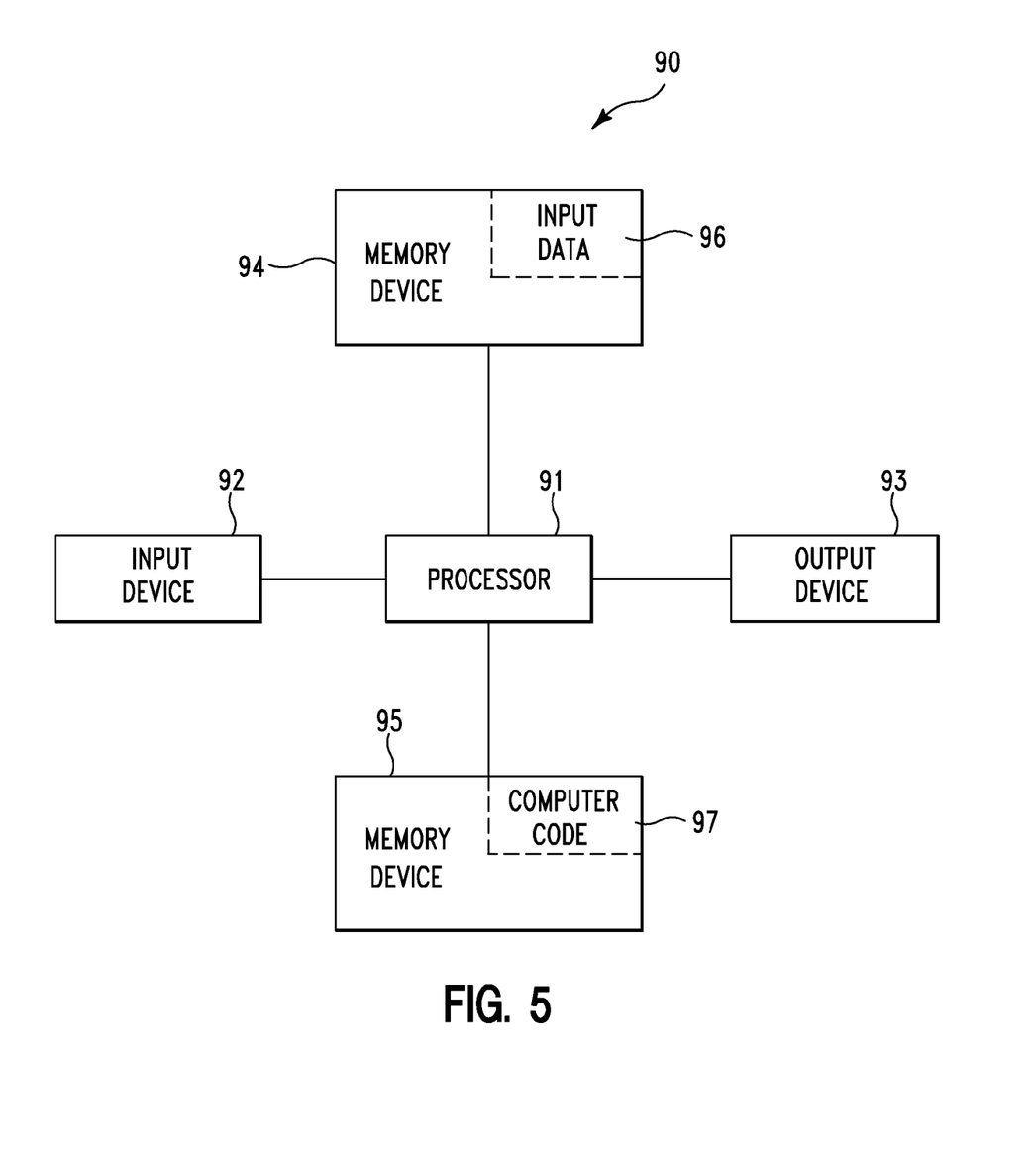
FIG. 5 illustrates a computer apparatus used for generating a secure password, in accordance with embodiments of the present invention.

FIG. 5 illustrates a computer apparatus 90 (e.g., computing system 14 of FIG. 1) used generating a secure password, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3-4) generating a secure password. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 3-4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service supplier who offers to generate a secure password. Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method generating a secure password. In another embodiment, the invention provides a business method that performs the process steps of the invention on a subscription, advertising, and/or fee basis. That is, a service supplier, such as a Solution Integrator, could offer to generate a secure password. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:
1. A method comprising:
generating, by a computer processor of a computing system executing password translation software, a random translation key;
generating, by said computer processor executing said password translation software, an encryption key;
storing, by said computer processor within an external memory device, said random translation key, wherein said external memory device is external to said computing system;
storing, by said computer processor within an internal memory device internal to said computing system, said encryption key;
first receiving, by said computer processor from a user, a first password comprising a first string of characters;
generating, by said computer processor executing said random translation key, a second password associated with said first password, wherein said second password comprises a second string of characters differing from said first string of characters, wherein said second string of characters comprises a greater number of characters than said first string of characters;
associating, by said computer processor in response to a command from said user, said second password with a first secure application associated with said user;
generating, by said computer processor executing said encryption key with respect to said random translation key, an encrypted translation key;
disabling a connection between said computing system and said external memory device;
after said disabling, enabling said connection between said computing system and said external memory device;
second receiving, by said computer processor from said user, said first password;
retrieving, by said computer processor from said external memory device in response to said second receiving, said encrypted translation key;
generating, by said computer processor executing said encryption key with respect to said encrypted translation key, said random translation key;
generating, by said computer processor, an additional translation key from said random translation key, said first password, a name identifying said secure application, a user name of said user, and a current ip address of said user;
after said generating said additional translation key, generating by said computer processor using said random translation key and said additional translation key, said second password;
presenting, by said computer processor in response to a command from said user, said second password from a clipboard to a login screen associated with said first secure application; and
enabling, by said computer processor in response to said presenting, access to said first secure application.
2. The method of claim 1, wherein said generating said random translation key comprises:
receiving, by said computer processor, a list comprising a first plurality of characters, wherein said first string of characters are selected from said first plurality of characters; and
generating, by said computer processor, a translation table comprising a second plurality of characters associated with said first plurality of characters, wherein said second plurality of characters are randomly generated, and wherein said second string of characters are selected from said second plurality of characters, wherein said generating said second password is enabled by said translation table, wherein said translation table is encrypted and stored within said external memory device, and wherein said second password is generated from said translation table.

3. The method of claim 1, further comprising:
enabling said connection between said computing system and said external memory device, wherein said generating said random translation key comprises:
  receiving, by said computer processor, a list comprising a first plurality of characters, wherein said first string of characters are selected from said first plurality of characters; and
  generating, by said computer processor, a first translation table comprising a second plurality of characters associated with said first plurality of characters, wherein said second plurality of characters are randomly generated, and wherein said second string of characters are selected from said second plurality of characters, and wherein said generating said second password is enabled by said translation table, wherein said translation table is encrypted and stored within said external memory device, and wherein said second password is stored within said first translation table;
enabling said connection between said computing system and said external memory device;
second receiving, by said computer processor from said user, said first password and an attribute associated with said first secure application;
retrieving, by said computer processor from said first translation table in response to said second receiving, said second password;
generating, by said computer processor in response to said second password, a second translation table from said first translation table, wherein said second translation table comprises a third plurality of characters associated with said first plurality of characters and said second plurality of characters, and wherein said third plurality of characters are randomly generated;
generating from said third plurality of characters, by said computer processor, a third password associated with said first password and said second password, wherein said third password comprises a third string of characters differing from said first string of characters and said second string of characters;
presenting, by said computer processor in response to a command from said user, said third password to a login screen associated with said first secure application; and
enabling, by said computer processor in response to said presenting, access to said first secure application.

4. The method of claim 1, further comprising:
generating, by said computer processor executing said random translation key, a third password associated with said first password, wherein said third password comprises a third string of characters differing from said first string of characters and said second string of characters;
associating, by said computer processor in response to a command from said user, said third password with a second secure application associated with said user, wherein said second secure application differs from said first secure application;
second receiving, by said computer processor from said user, said first password and an attribute describing said second secure application;
retrieving, by said computer processor from said external memory device in response to said second receiving, said random translation key;
generating, by said computer processor executing said random translation key, a fourth password associated with said third password and said attribute, wherein said third password comprises a third string of characters differing from said first string of characters and said second string of characters;
associating, by said computer processor in response to a command from said user, said fourth password with said second secure application;
second presenting, by said computer processor in response to a command from said user, said fourth password to a login screen associated with said second secure application; and
enabling, by said computer processor in response to said second presenting, access to said second secure application.

5. The method of claim 1, wherein each character of said first string of characters is associated with a plurality of characters of said second plurality of characters.

6. The method of claim 1, wherein said external memory device comprises a USB connected memory device.

7. A computing system comprising a computer processor coupled to a computer-readable memory unit, said memory unit comprising instructions that when executed by the computer processor implements a method comprising:
generating, by said computer processor executing password translation software, a random translation key;
generating, by said computer processor executing said password translation software, an encryption key;
storing, by said computer processor within an external memory device, said random translation key, wherein said external memory device is external to said computing system;
storing, by said computer processor within an internal memory device internal to said computing system, said encryption key;
first receiving, by said computer processor from a user, a first password comprising a first string of characters;
generating, by said computer processor executing said random translation key, a second password associated with said first password, wherein said second password comprises a second string of characters differing from said first string of characters, wherein said second string of characters comprises a greater number of characters than said first string of characters;
associating, by said computer processor in response to a command from said user, said second password with a first secure application associated with said user;
generating, by said computer processor executing said encryption key with respect to said random translation key, an encrypted translation key;
disabling a connection between said computing system and said external memory device;
after said disabling, enabling said connection between said computing system and said external memory device;
second receiving, by said computer processor from said user, said first password;
retrieving, by said computer processor from said external memory device in response to said second receiving, said encrypted translation key;
generating, by said computer processor executing said encryption key with respect to said encrypted translation key, said random translation key;
generating, by said computer processor, an additional translation key from said random translation key, said first password, a name identifying said secure application, a user name of said user, and a current ip address of said user;

after said generating said additional translation key, generating by said computer processor using said random translation key and said additional translation key, said second password;

presenting, by said computer processor in response to a command from said user, said second password from a clipboard to a login screen associated with said first secure application; and enabling, by said computer processor in response to said presenting, access to said first secure application.

8. The computing system of claim 7, wherein said method further comprises:

receiving, by said computer processor, a list comprising a first plurality of characters, wherein said first string of characters are selected from said first plurality of characters; and generating, by said computer processor, a translation table comprising a second plurality of characters associated with said first plurality of characters, wherein said second plurality of characters are randomly generated, and wherein said second string of characters are selected from said second plurality of characters, wherein said generating said second password is enabled by said translation table, wherein said translation table is encrypted and stored within said external memory device, and wherein said second password is generated from said translation table.

9. The computing system of claim 7, wherein said method further comprises:

enabling said connection between said computing system and said external memory device, wherein said generating said random translation key comprises:

receiving, by said computer processor, a list comprising a first plurality of characters, wherein said first string of characters are selected from said first plurality of characters; and generating, by said computer processor, a first translation table comprising a second plurality of characters associated with said first plurality of characters, wherein said second plurality of characters are randomly generated, and wherein said second string of characters are selected from said second plurality of characters, and wherein said generating said second password is enabled by said translation table, wherein said translation table is encrypted and stored within said external memory device, and wherein said second password is stored within said first translation table;

enabling said connection between said computing system and said external memory device;

second receiving, by said computer processor from said user, said first password and an attribute associated with said first secure application;

retrieving, by said computer processor from said first translation table in response to said second receiving, said second password;

generating, by said computer processor in response to said second password, a second translation table from said first translation table, wherein said second translation table comprises a third plurality of characters associated with said first plurality of characters and said second plurality of characters, and wherein said third plurality of characters are randomly generated;

generating from said third plurality of characters, by said computer processor, a third password associated with said first password and said second password, wherein said third password comprises a third string of characters differing from said first string of characters and said second string of characters;

presenting, by said computer processor in response to a command from said user, said third password to a login screen associated with said first secure application; and enabling, by said computer processor in response to said presenting, access to said first secure application.

10. The computing system of claim 7, wherein said method further comprises:

generating, by said computer processor executing said random translation key, a third password associated with said first password, wherein said third password comprises a third string of characters differing from said first string of characters and said second string of characters;

associating, by said computer processor in response to a command from said user, said third password with a second secure application associated with said user, wherein said second secure application differs from said first secure application;

second receiving, by said computer processor from said user, said first password and an attribute describing said second secure application;

retrieving, by said computer processor from said external memory device in response to said second receiving, said random translation key;

generating, by said computer processor executing said random translation key, a fourth password associated with said third password and said attribute, wherein said third password comprises a third string of characters differing from said first string of characters and said second string of characters;

associating, by said computer processor in response to a command from said user, said fourth password with said second secure application;

second presenting, by said computer processor in response to a command from said user, said fourth password to a login screen associated with said second secure application; and enabling, by said computer processor in response to said second presenting, access to said second secure application.

11. The computing system of claim 7, wherein each character of said first string of characters is associated with a plurality of characters of said second plurality of characters.

12. The computing system of claim 7, wherein said external memory device comprises a USB connected memory device.

13. A computer program product, comprising a computer readable storage device storing a computer readable program code, said computer readable program code comprising an algorithm that when executed by a computer processor of a computing system implements a method, said method comprising:

generating, by said computer processor executing password translation software, a random translation key;

generating, by said computer processor executing said password translation software, an encryption key;

storing, by said computer processor within an external memory device, said random translation key, wherein said external memory device is external to said computing system;

storing, by said computer processor within an internal memory device internal to said computing system, said encryption key;

first receiving, by said computer processor from a user, a first password comprising a first string of characters;

generating, by said computer processor executing said random translation key, a second password associated with said first password, wherein said second password comprises a second string of characters differing from said first string of characters, wherein said second string of characters comprises a greater number of characters than said first string of characters;

associating, by said computer processor in response to a command from said user, said second password with a first secure application associated with said user;

generating, by said computer processor executing said encryption key with respect to said random translation key, an encrypted translation key;

disabling a connection between said computing system and said external memory device;

after said disabling, enabling said connection between said computing system and said external memory device;

second receiving, by said computer processor from said user, said first password;

retrieving, by said computer processor from said external memory device in response to said second receiving, said encrypted translation key;

generating, by said computer processor executing said encryption key with respect to said encrypted translation key, said random translation key;

generating, by said computer processor, an additional translation key from said random translation key, said first password, a name identifying said secure application, a user name of said user, and a current ip address of said user;

after said generating said additional translation key, generating by said computer processor using said random translation key and said additional translation key, said second password;

presenting, by said computer processor in response to a command from said user, said second password from a clipboard to a login screen associated with said first secure application; and enabling, by said computer processor in response to said presenting, access to said first secure application.

14. The computer program product of claim 13, wherein said method further comprises:

receiving, by said computer processor, a list comprising a first plurality of characters, wherein said first string of characters are selected from said first plurality of characters; and generating, by said computer processor, a translation table comprising a second plurality of characters associated with said first plurality of characters, wherein said second plurality of characters are randomly generated, and wherein said second string of characters are selected from said second plurality of characters, wherein said generating said second password is enabled by said translation table, wherein said translation table is encrypted and stored within said external memory device, and wherein said second password is generated from said translation table.

15. The computer program product of claim 13, wherein said method further comprises:

enabling said connection between said computing system and said external memory device, wherein said generating said random translation key comprises:

receiving, by said computer processor, a list comprising a first plurality of characters, wherein said first string of characters are selected from said first plurality of characters; and generating, by said computer processor, a first translation table comprising a second plurality of characters associated with said first plurality of characters, wherein said second plurality of characters are randomly generated, and wherein said second string of characters are selected from said second plurality of characters, and wherein said generating said second password is enabled by said translation table, wherein said translation table is encrypted and stored within said external memory device, and wherein said second password is stored within said first translation table;

enabling said connection between said computing system and said external memory device;

second receiving, by said computer processor from said user, said first password and an attribute associated with said first secure application;

retrieving, by said computer processor from said first translation table in response to said second receiving, said second password;

generating, by said computer processor in response to said second password, a second translation table from said first translation table, wherein said second translation table comprises a third plurality of characters associated with said first plurality of characters and said second plurality of characters, and wherein said third plurality of characters are randomly generated;

generating from said third plurality of characters, by said computer processor, a third password associated with said first password and said second password, wherein said third password comprises a third string of characters differing from said first string of characters and said second string of characters;

presenting, by said computer processor in response to a command from said user, said third password to a login screen associated with said first secure application; and enabling, by said computer processor in response to said presenting, access to said first secure application.

16. The computer program product of claim 13, wherein said method further comprises:

generating, by said computer processor executing said random translation key, a third password associated with said first password, wherein said third password comprises a third string of characters differing from said first string of characters and said second string of characters;

associating, by said computer processor in response to a command from said user, said third password with a second secure application associated with said user, wherein said second secure application differs from said first secure application;

second receiving, by said computer processor from said user, said first password and an attribute describing said second secure application;

retrieving, by said computer processor from said external memory device in response to said second receiving, said random translation key;

generating, by said computer processor executing said random translation key, a fourth password associated with said third password and said attribute, wherein said third password comprises a third string of characters differing from said first string of characters and said second string of characters;

associating, by said computer processor in response to a command from said user, said fourth password with said second secure application;

second presenting, by said computer processor in response to a command from said user, said fourth password to a login screen associated with said second secure application; and enabling, by said computer processor in response to said second presenting, access to said second secure application.

17. The computer program product of claim 13, wherein each character of said first string of characters is associated with a plurality of characters of said second plurality of characters.

18. The computer program product of claim 13, wherein said external memory device comprises a USB connected memory device.

\* \* \* \* \*